(12) United States Patent
Jun et al.

(10) Patent No.: US 12,546,752 B2
(45) Date of Patent: Feb. 10, 2026

(54) MATERIAL IDENTIFICATION USING VIBRATION SIGNALS

(71) Applicant: Caterpillar Trimble Control Technologies LLC, Dayton, OH (US)

(72) Inventors: Jung Hyun Jun, Canterbury (NZ); Peter France, Christchurch (NZ)

(73) Assignee: Caterpillar Trimble Control Technologies LLC, Dayton, OH (US)

( * ) Notice: Subject to any disclaimer, the term of this patent is extended or adjusted under 35 U.S.C. 154(b) by 510 days.

(21) Appl. No.: 17/985,371

(22) Filed: Nov. 11, 2022

(65) Prior Publication Data

US 2023/0152279 A1    May 18, 2023

Related U.S. Application Data

(60) Provisional application No. 63/280,901, filed on Nov. 18, 2021.

(51) Int. Cl.

| | |
|---|---|
| *G01N 29/44* | (2006.01) |
| *E02F 9/26* | (2006.01) |
| *G01N 29/12* | (2006.01) |
| *G01N 29/24* | (2006.01) |
| *G06N 3/08* | (2023.01) |
| *G01N 29/14* | (2006.01) |

(52) U.S. Cl.
CPC ......... *G01N 29/4454* (2013.01); *E02F 9/261* (2013.01); *G01N 29/12* (2013.01); *G01N 29/24* (2013.01); *G06N 3/08* (2013.01); *G01N 29/14* (2013.01); *G01N 29/44* (2013.01); *G01N 2291/023* (2013.01)

(58) Field of Classification Search
USPC .......................................... 702/56
See application file for complete search history.

(56) References Cited

U.S. PATENT DOCUMENTS

| | | | |
|---|---|---|---|
| 2018/0156757 A1* | 6/2018 | Nagrodsky | G01N 29/12 |
| 2019/0297182 A1* | 9/2019 | Camacho Perez | G06N 20/00 |
| 2022/0381007 A1* | 12/2022 | Hodel | E02F 3/437 |
| 2023/0106822 A1* | 4/2023 | Jun | G01P 15/00 |
| | | | 701/50 |
| 2024/0369524 A1* | 11/2024 | Artan | G06N 3/09 |

* cited by examiner

*Primary Examiner* — Paul D Lee

(74) *Attorney, Agent, or Firm* — Kilpatrick Townsend & Stockton LLP

(57) ABSTRACT

Described herein are systems, methods, and other techniques for determining a material type while an implement of a construction machine is interacting with a ground surface. A vibration signal that is indicative of a movement of the implement is captured. One or more features are extracted from the vibration signal. The one or more features are provided to a machine-learning model to generate a model output. The material type of the ground surface is predicted based on the model output.

20 Claims, 10 Drawing Sheets

|  | Top Soil | AP 40 | Pit Run |
|---|---|---|---|
| Amplitude High Frequency | Low | High | High |
| Medium Frequency | Low | High | High |
| Low Frequency | Low | Medium | High |
|  | Low | Low | High |

FIG. 8

MATERIAL IDENTIFICATION USING VIBRATION SIGNALS

CROSS-REFERENCES TO RELATED APPLICATIONS

This application claims the benefit of priority to U.S. Provisional Patent Application No. 63/280,901, filed Nov. 18, 2021, entitled "MATERIAL IDENTIFICATION USING VIBRATION SIGNALS," the entire content of which is incorporated herein by reference for all purposes.

BACKGROUND OF THE INVENTION

Modern mobile machinery, including construction and agricultural machines, have dramatically increased the efficiency of performing various work-related tasks. For example, earthmoving machines employing automatic grade control systems are able to grade project areas using fewer passes than what was previously done manually. As another example, modern asphalt pavers and other road makers have allowed replacement of old roads and construction of new roads to occur on the order of hours and days instead of what once took place over weeks and months. Due to the automation of various aspects, construction and agriculture projects can be carried out by crews with fewer individuals than what was previously required. Much of the technological advances of mobile machinery are owed in part to the availability of accurate sensors that allow real-time monitoring of the condition and position of a machine's components and/or the environment surrounding the machine.

SUMMARY

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a method of determining a material type while an implement of a construction machine is interacting with a ground surface, the method comprising: capturing a vibration signal that is indicative of a movement of the implement; extracting one or more features from the vibration signal; providing the one or more features to a machine-learning model to generate a model output; and predicting the material type of the ground surface based on the model output.

Example 2 is the method of example(s) 1, wherein the vibration signal is captured using a vibration sensor mounted to the construction machine.

Example 3 is the method of example(s) 2, wherein the vibration sensor includes an accelerometer and the vibration signal includes an acceleration signal.

Example 4 is the method of example(s) 2, wherein the vibration sensor includes a gyroscope and the vibration signal includes a rotation signal.

Example 5 is the method of example(s) 2, wherein the vibration sensor is mounted to the implement.

Example 6 is the method of example(s) 1, wherein the one or more features include at least one of signal amplitude features or signal frequency features.

Example 7 is the method of example(s) 1, wherein the machine-learning model is a pre-trained artificial recurrent neural network, a feed-forward neural network, or a support-vector machine.

Example 8 is the method of example(s) 1, further comprising: adjusting a ground surface map based on the material type.

Example 9 is the method of example(s) 1, further comprising: predicting a moisture level of the ground surface based on the model output.

Example 10 is the method of example(s) 1, further comprising: predicting a compactness level of the ground surface based on the model output.

Example 11 is the method of example(s) 1, further comprising: predicting a first material type of a first portion of the ground surface based on the model output; and predicting a second material type of a second portion of the ground surface based on the model output.

Example 12 is the method of example(s) 1, further comprising: predicting a location of a boundary between a first material type of a first portion of the ground surface and a second material type of a second portion of the ground surface based on the model output.

Example 13 is the method of example(s) 1, further comprising: determining a force being applied to the ground surface associated with the movement of the implement; and predicting a compactness level of the ground surface based on the force.

Example 14 is the method of example(s) 13, wherein a force signal associated with the force is provided to the machine-learning model to generate the model output, and wherein the compactness level of the ground surface is predicted based on the model output.

Example 15 is the method of example(s) 13, wherein the force is measured using pressure sensors.

Example 16 is the method of example(s) 13, wherein the force is determined based on valve commands that control hydraulics of the construction machine.

Example 17 is a system comprising: one or more processors; and a computer-readable medium comprising instructions that, when executed by the one or more processors, cause the one or more processors to perform the method of any of example(s) 1 to 16.

Example 18 is a non-transitory computer-readable medium comprising instructions that, when executed by the one or more processors, cause the one or more processors to perform the method of any of example(s) 1 to 16.

BRIEF DESCRIPTION OF THE DRAWINGS

FIG. 8 illustrates a table that shows characteristics of signal amplitude features and signal frequency features for different material types.

DETAILED DESCRIPTION OF THE INVENTION

Figure 1A:
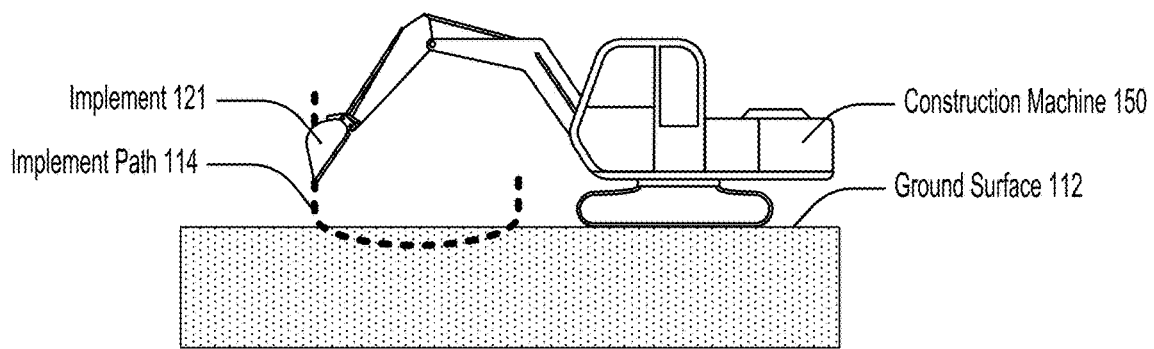
FIGS. 1A-1C illustrate an example modification of a ground surface map based on an implement path and a detected vibration signal.

In many instances, it can be advantageous for construction machines, such as earthmoving machines, to determine the material or soil type of the ground in which they are operating. For example, to improve efficiency while digging or engaging with the ground, a construction machine can increase the movement speed of its implement for softer soil types and decrease the movement speed for harder soil types. As another example, since different soil types have different densities, the weight of an excavator's bucket full of one material type may be drastically different than another material type, and the movement speed or path of the bucket can be adjusted accordingly when the material type is known.

As another example, the identified material type can be used for mapping purposes. For example, construction machines may maintain a map of the surrounding surface of the ground. This map, which may alternatively be referred to as a "ground surface map", may include a current elevation or height for each of multiple locations surrounding the machine. By identifying the material type at different locations, the ground surface map can be detailed with the material types along with the elevations. This can inform the operator of the construction machine along with any automated processes as to the compactness and stability of the surrounding surfaces.

Embodiments of the present disclosure provide techniques for accurately identifying the material or soil type while a construction machine is interacting with the ground. The disclosed techniques may rely on a vibration signal captured using a vibration sensor mounted to the construction machine. The vibration signal may be indicative of the movement of the implement during a digging event. In various embodiments, the vibration sensor may be mounted directly to the implement or mounted elsewhere on the construction machine.

By analyzing the vibration signal, it has been observed that the vibration of the vehicle's implement, both its amplitude and frequency, depends on the ground type and the digging speed and angle of the implement. Furthermore, it has been observed that vibration characteristics change during a pass of the implement. For example, the vibration characteristics are different at the beginning of a pass than at the end of the pass since the amount of accumulated material increases during the pass. Therefore, information regarding the stage of a pass can be also be important for determining the material type.

Some embodiments may utilize trained machine-learning models that receive features of the vibration signal as input to generate the material type. In some embodiments, a natural language processing (NLP) approach can be employed, in which a pass is treated as a sentence and an NLP model is used to solve for the material type. In some embodiments, a transformer model can be employed that differentially weights the significance of each part of the sequential input vibration signal. In some embodiments, a machine-learning model may include a neural network (recurrent or feed forward) or a support-vector machine.

Several advantages are achieved by way of the present disclosure. For example, as noted above, by predicting accurate material types, embodiments of the present disclosure allow for accurate adjustments and data enrichment to the ground surface map. Such adjustments may be made in real time as the construction machine is operating within a construction environment. As another example, embodiments provide the ability to track the movement of certain types of materials (e.g., where certain types of materials come from and where they go). In certain applications, such as mining, it may be desirable to know whether material is valuable ore or low-value spoil. As another example, embodiments allow for accurate material identification in situations where visual-based approaches are ineffective, such as when obstructions are present.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

Figure 1B:
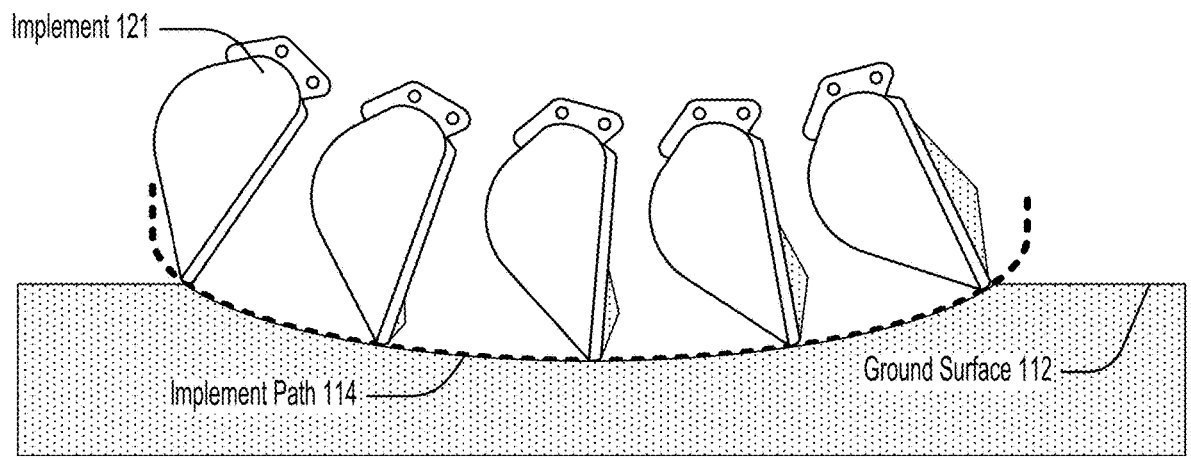
Figure 1C:
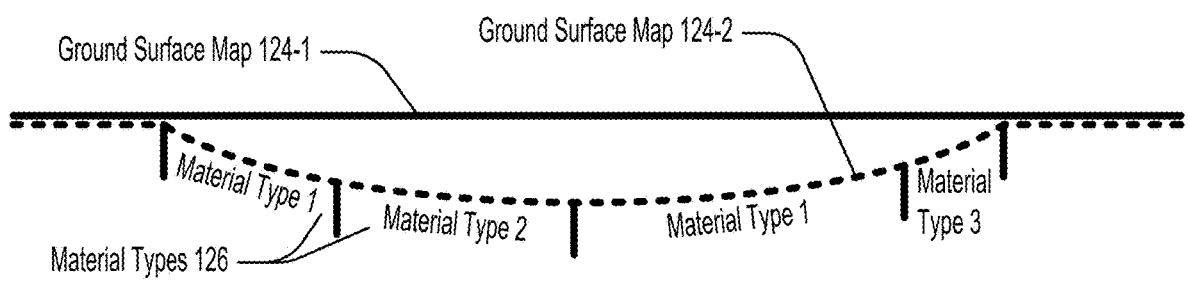

FIGS. 1A-1C illustrate an example modification of a ground surface map 124 based on an implement path 114 and a detected vibration signal, in accordance with some embodiments of the present disclosure. In FIG. 1A, a construction machine 150 begins moving an implement 121 along implement path 114. In various embodiments, implement path 114 may be set by an operator of the construction machine and/or may be automatically generated based on the details of a construction project or other work-related task. In FIG. 1B, implement 121 follows implement path 114 and cuts into ground surface 112, thereby modifying ground surface 112 by removing the earth above implement path 114 while leaving the earth below implement path 114.

In FIG. 1C, ground surface map 124 is adjusted based on implement path 114 and a vibration signal that is detected during the time frame of the digging action. In the illustrated example, a previous ground surface map 124-1 is adjusted to produce a new ground surface map 124-2 by replacing previous ground surface map 124-1 with implement path 114 for the locations between where ground surface map 124-1 intersects with implement path 114. For the locations outside of where ground surface map 124-1 intersects with implement path 114, new ground surface map 124-2 is set equal to previous ground surface map 124-1. Further illustrated in FIG. 1C are identified material types 126 along ground surface map 124-2. Materials types 126 are identified based on an analysis of the detected vibration signal.

Figure 2:
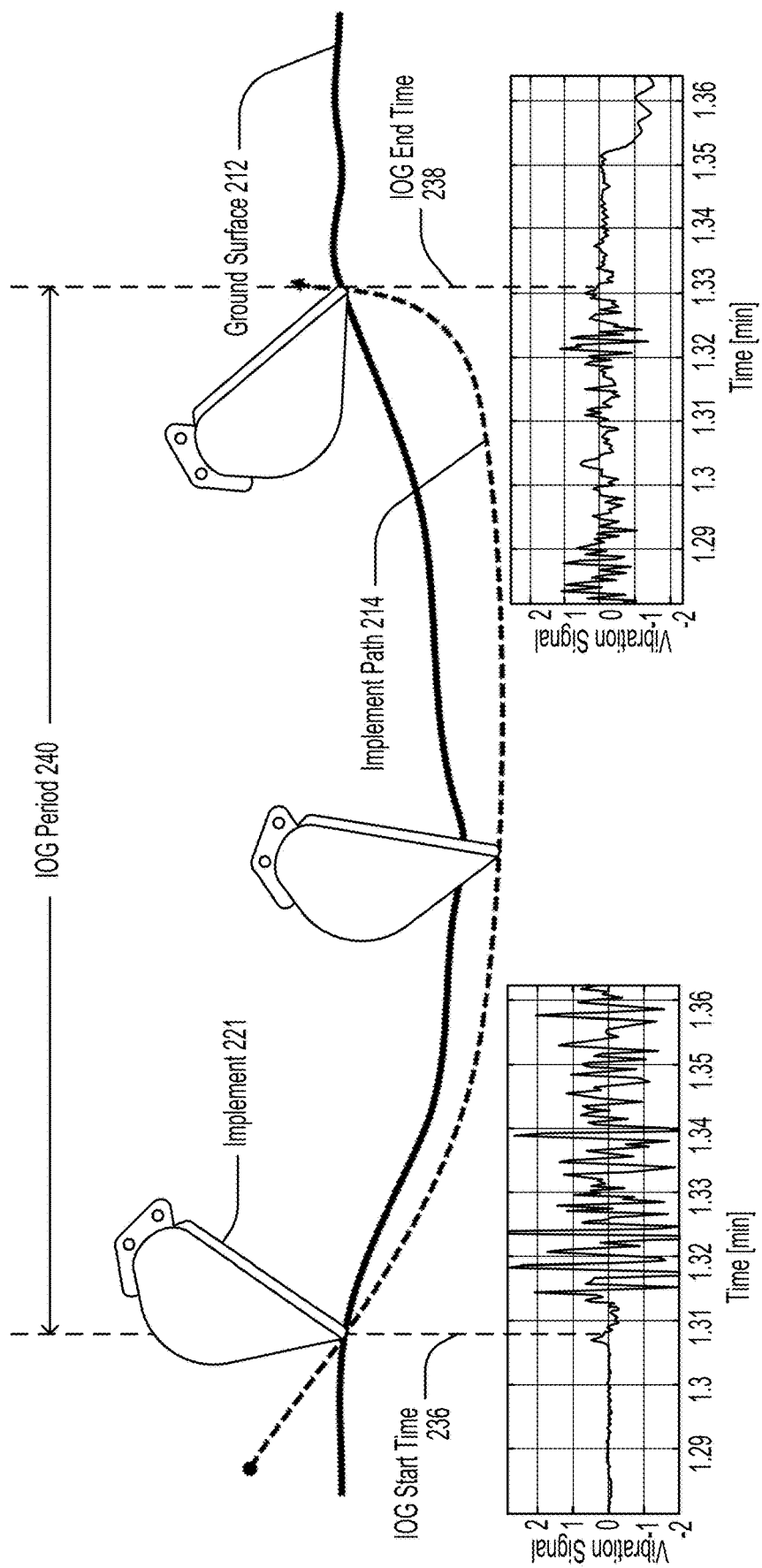
FIG. 2 illustrates an example analysis of a vibration signal.

FIG. 2 illustrates an example analysis of a vibration signal 242, in accordance with some embodiments of the present disclosure. In the illustrated example, vibration signal 242 is captured using a vibration sensor while implement 221 is following an implement path 214 that passes through ground surface 212. While not shown, the vibration sensor may be mounted directly to implement 221 or elsewhere on the construction machine. The illustrated vibration signal is an acceleration signal along a particular axis (or any direction in space) that includes both positive and negative acceleration values.

Based on the features in vibration signal 242, an implement on ground (JOG) start time 236 (between 1.3 minutes and 1.31 minutes) at which implement 221 begins digging along ground surface 212 and an JOG end time 238 (between 1.46 minutes and 1.47 minutes) at which implement 221 ends digging along ground surface 212 are predicted. In the illustrated example, vibration signal 242 is shown to have higher amplitudes during JOG period 240 compared to outside JOG period 240. Vibration signal 242 is also shown to generally decrease in amplitude within JOG period 240 as the amount of accumulated material increases.

Figure 3:
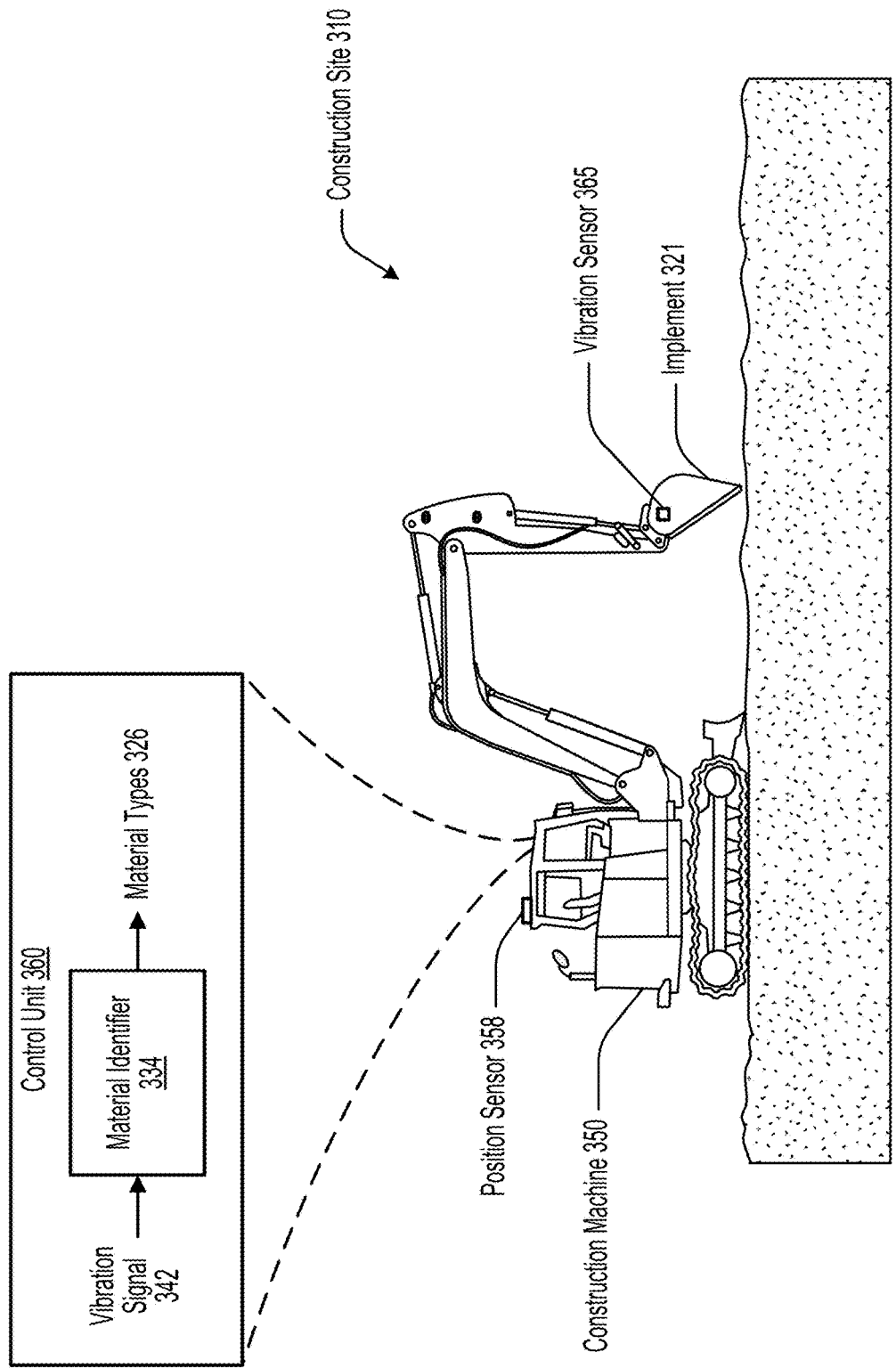
FIG. 3 illustrates an example implementation of one or more techniques of the present disclosure within a construction environment.

FIG. 3 illustrates an example implementation of one or more techniques of the present disclosure within a construction environment. Specifically, FIG. 3 shows a construction machine 350 being deployed at a construction site 310 and having the control thereof at least partially implemented by a control unit 360 which, in various embodiments, may be communicatively coupled to a position sensor 358 and a vibration sensor 365 through a wired and/or wireless connection. While construction site 310 is generally described herein as corresponding to an earthmoving site, the present disclosure may be applicable to a wide variety of construction, maintenance, or agricultural projects in which heavy equipment or mobile machinery are used. Similarly, while construction machine 350 is generally described herein as corresponding to an earthmoving construction machine, the various techniques described herein may be applicable to a wide variety of construction machines or heavy equipment such as graders, excavators, bulldozers, backhoes, pavers (e.g., concrete, asphalt, slipform, vibratory, etc.), compactors, scrapers, loaders, material handlers, combine harvesters, spreaders, and the like.

In some embodiments, construction machine 350 may include a tractor with wheels, axles, and a gasoline-, diesel-, electric-, or steam-powered engine for providing power and traction to construction machine 350 to drive along a desired path, often at a constant speed. Construction machine 350 may be a tracked vehicle that incorporates a continuous track of treads or track plates that are driven by the vehicle's wheels. An operator of construction machine 350 may provide inputs to control unit 360 using various input devices such as levers, switches, buttons, pedals, steering wheels, and touch screens, which can cause various actuators to move construction machine 350.

In some instances, construction machine 350 may include an implement 321, which may be the primary component of construction machine 350 that is controlled to interact with elements of construction site 310. For example, at an earthmoving site, implement 321 may be the component of construction machine 350 that interacts with (e.g., pushes, scoops, cuts, etc.) the earth, such as the blade of a bulldozer, the bucket of an excavator, or the drum of a compactor. As another example, at an agricultural site, implement 321 may be the header of a combine harvester or the boom of a spreader. As another example, at a road construction site, implement 321 may be the screed of an asphalt paver.

It should be appreciated that, in some embodiments, implement 321 and construction machine 350 may be considered to be separate bodies that have a semi-rigid coupling between them. The coupling is semi-rigid in that the bodies can move relative to each other but they can also be fixed at a given orientation. Some examples of semi-rigid couplings used on construction or earthmoving equipment include c-frames, angle c-frames, push arms, L-shaped push arms, and the like.

In some embodiments, control unit 360 may determine a geospatial position 322 of construction machine 350 based on sensor data captured by one or more sensors (e.g., position sensor 358) mounted to construction machine 350. For example, position sensor 358 may be a global navigation satellite systems (GNSS) receiver that receives wireless signals from one or more GNSS satellites 302. By processing the received wireless signals, a position of the GNSS receiver may be calculated. During operation of construction machine 350, geospatial position 322 is determined and is used to query a site design, which may provide translations between two-dimensional (2D) positions within construction site 110 and a desired ground surface or digging depth.

As described herein, in some embodiments, vibration sensor 365 may be used to capture a vibration signal 342 that is indicative of the movement of implement 321. Vibration signal 342 may be provided to a material identifier 334, which may extract features from vibration signal 342 and provide the extracted features to a machine-learning model that is used to predict one or more material types 326.

Figure 4:
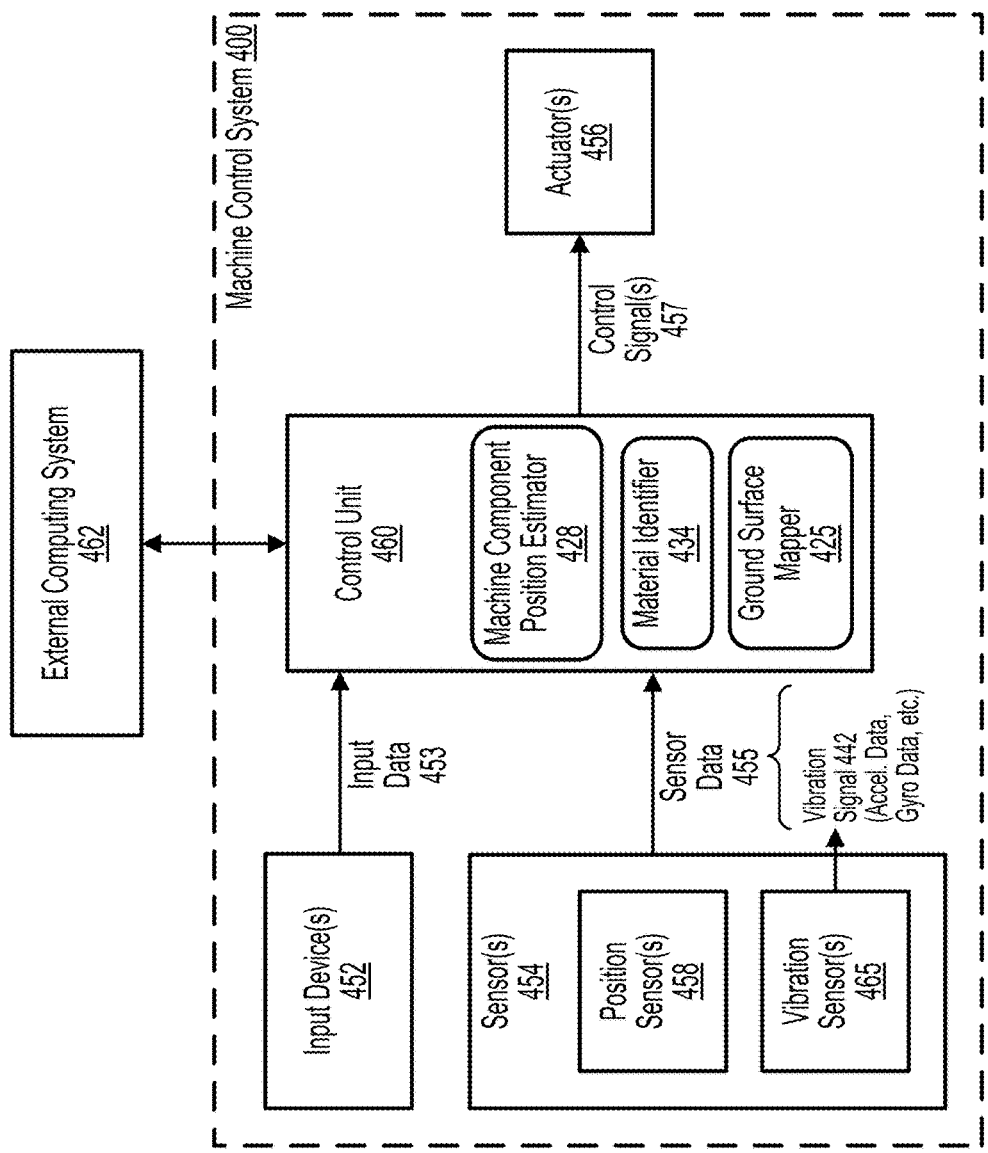
FIG. 4 illustrates an example machine control system.

FIG. 4 illustrates an example machine control system 400, in accordance with some embodiments of the present disclosure. Machine control system 400 may include various input devices 452, sensors 454, actuators 456, and computing devices for allowing one or more operators of the construction machine to complete a work-related task. The components of machine control system 400 may be mounted to or integrated with the components of the construction machine such that the construction machine may be considered to include machine control system 400. The components of machine control system 400 may be communicatively coupled to each other via one or more wired and/or wireless connections.

Machine control system 400 may include a control unit 460 that receives data from the various sensors and inputs and generates commands that are sent to the various actuators and output devices. In the illustrated example, control unit 460 receives input data 453 from input device(s) 452 and sensor data 455 from sensor(s) 454, and generates control signal(s) 457 which are sent to actuator(s) 456. Control unit 460 may include one or more processors and an associated memory. In some embodiments, control unit 460 may be communicatively coupled to an external computing system 462 located external to machine control system 400 and the construction machine. External computing system 462 may send instructions to control unit 460 of the details of a work-related task. External computing system 462 may also send alerts and other general information to control unit 460, such as traffic conditions, weather conditions, the locations and status of material transfer vehicles, and the like.

In some embodiments, input device(s) 452 may receive input data 453 that indicates a desired movement of the vehicle, a desired movement of the implement, a desired height of the implement, an activation of one or more mechanisms on the implement (e.g., rotating the bucket of an excavator), and the like. Input device(s) 452 may include a keyboard, a touchscreen, a touchpad, a switch, a lever, a button, a steering wheel, an acceleration pedal, a brake pedal, and the like. In some embodiments, input device(s) 452 may be mounted to any physical part of the vehicle, such as within the cab of the vehicle.

In some embodiments, sensor(s) 454 may include one or more position sensor(s) 458 and/or vibration sensor(s) 465. Position sensor(s) 458 may be a combination of GNSS receivers, which determine position using wireless signals received from satellites, and total stations, which determine position by combining distance, vertical angle, and horizontal angle measurements. Vibration sensor(s) 465 may include one or more sensors that detect movement of the components of the construction machine to which they are rigidly attached. In some instances, vibration sensor(s) 465 may include one or more microphones or other acoustic sensors. In some instances, vibration sensor(s) 465 may include one or more inertial measurement unit (IMU) sensors and/or the elements thereof. For example, vibration sensor(s) 465 may include one or more gyroscopes for detecting angular acceleration, angular rate and/or angular position (or other rotational signals or data), one or more accelerometers for detecting linear acceleration, linear velocity, and/or linear position, and/or one or more magnetometers for detecting the above-listed types of data, among other possibilities.

In some embodiments (such as, for example, when implemented as a gyroscope), vibration sensor(s) 465 may directly detect angular rate and may integrate to obtain angular position, or alternatively a vibration sensor may directly measure angular position and may determine a change in angular position (e.g., compute the derivative) to obtain angular rate. In many instances, vibration sensor(s) 465 can be used to determine the yaw angle (rotation angle with respect to a vertical axis), the pitch angle (rotation angle with respect to a transverse axis), and/or the roll angle (rotation angle with respect to a longitudinal axis) of the construction machine.

Control unit 460 may include various controllers and modules to assist in the generation of control signal(s) 457 and the computation of other data. Each of the controllers and modules may include dedicated hardware and/or may be performed using the main processor and/or memory of control unit 460. In some embodiments, control unit 460 may include a machine component position estimator 428 that estimates the positions of the machine's components based on sensor data 455. For example, machine component position estimator 428 may use sensor data 455 to estimate the positions of the implement during an TOG instance. Optionally, machine component position estimator 428 may generate a model of the entire construction machine as it is currently situated within the construction site. In such embodiments, the model may be generated not only based on sensor data 455 but additionally using feedback from the actuator(s) 456 and/or by tracking control signal(s) 457.

In some embodiments, control unit 460 may include material identifier 434 that uses vibration signal 442 along with other sensor data 455 to predict a material or soil type during a digging period. Each detected material type may be fed into a ground surface mapper 425 that maintains a ground surface map. Ground surface mapper 425 may adjust the ground surface map based on each material type provided by material identifier along with the implement positions provided by machine component position estimator 428.

Control signal(s) 457 may include direct current (DC) or alternating current (AC) voltage signals, DC or AC current signals, and/or information-containing signals. An example of an information-containing signal may be controller area network (CAN) message that may be sent along a CAN bus or other communication medium. In some instances, control signal(s) 457 include a pneumatic or hydraulic pressure. Upon receiving control signal(s) 457, actuator(s) 456 may be caused to move in a specified manner, such as by extending, retracting, rotating, lifting, or lowering by a specified amount. Actuator(s) 456 may use various forms of power to provide movement to the components of the construction machine. For example, actuator(s) 456 may be electric, hydraulic, pneumatic, mechanical, or thermal, among other possibilities.

Figure 5:
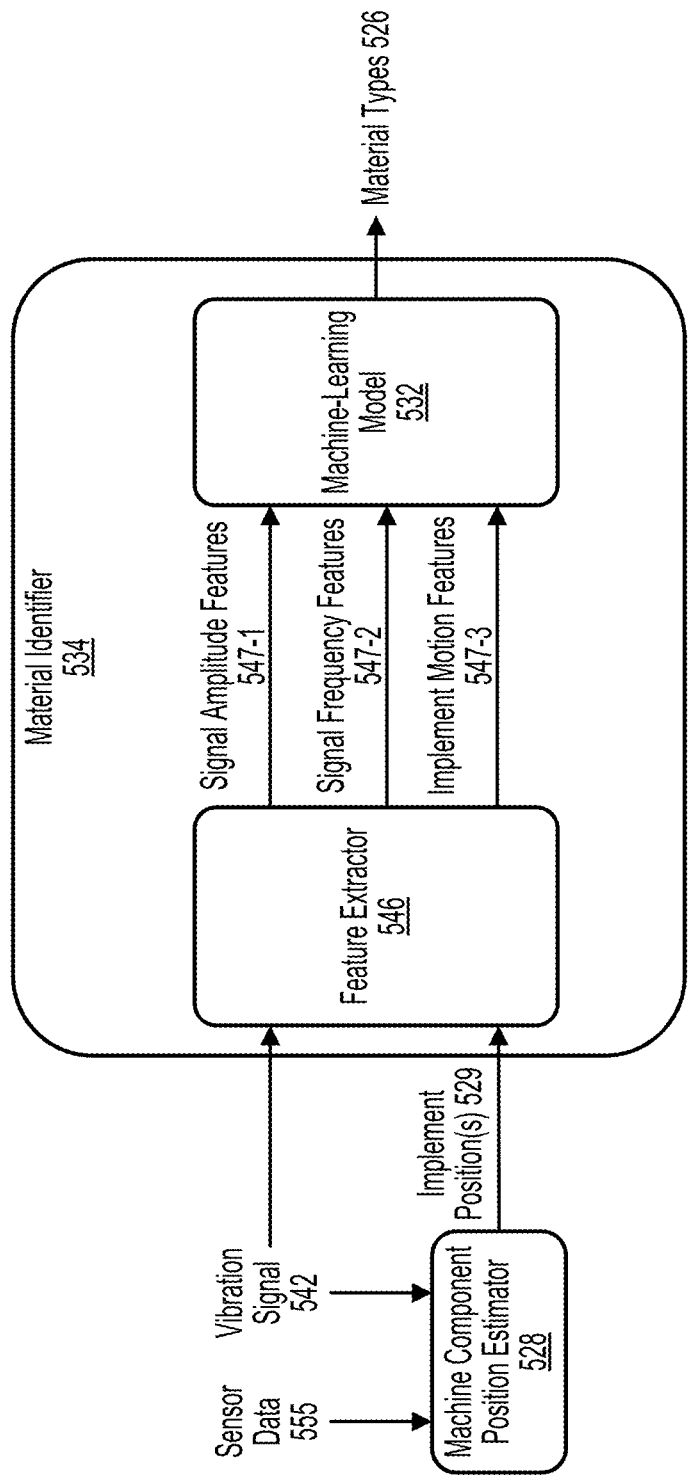
FIG. 5 illustrates an example material identifier.

FIG. 5 illustrates an example material identifier 534, in accordance with some embodiments of the present disclosure. As inputs, material identifier 534 may be provided with a vibration signal 542 and a set of implement position(s) 529, which may be estimated by a machine component position estimator 528 based on sensor data 555 (and optionally based on vibration signal 542). Material identifier 534 may include a feature extractor 546 that extracts one or more features 547 from vibration signal 542 (and optionally implement position(s) 529).

In some embodiments, features 547 may include signal amplitude features 547-1 related to the amplitude of vibration signal 542. For example, signal amplitude features 547-1 may include the time-varying amplitude of vibration signal 542, the magnitude of the amplitude of vibration signal 542, the average of the amplitude of vibration signal 542, the standard deviation of the amplitude of vibration signal 542, the short-time average amplitude over long-time average amplitude (STA/LTA) of vibration signal 542, the long-time vibration changes in vibration signal 542 (for example, when vibration signal 542 is captured by a gyro), among other possibilities.

In some embodiments, features 547 may include signal frequency features 547-2 related to the frequency of vibration signal 542. For example, signal frequency features 547-2 may include the time-varying frequency of vibration signal 542 (e.g., over sequential time windows), the high-frequency energy of vibration signal 542, the low-frequency energy of vibration signal 542, the power spectral density of vibration signal 542, among other possibilities.

In some embodiments, features 547 may include implement motion features 547-3 determined based on implement position(s) 529 (and optionally based on vibration signal 542 when vibration signal 542 includes an IMU signal). For example, implement motion features 547-3 may include the curl or rotation of the implement (e.g., the curl of the excavator's bucket), the distance between the implement and a reference point on the construction machine (e.g., the distance between the implement and the cab), the direction of movement of the implement, the slewing of the construction machine, among other possibilities.

Features 547 may be provided to a machine-learning model 532 that generates an output based on features 547. For example, features 547 may be used for the input to machine-learning model 532 and may be passed through the layers or nodes of machine-learning model 532. The output generated by machine-learning model 532 may be referred to as a model output. The model output may include one or more material types 526. In various embodiments, material types 526 may be directly outputted by machine-learning model 532 or they may be obtained by performing one or more post-processing steps on the model output.

Machine-learning model 532 may be a support-vector machine, a neural network, a convolutional neural network, a Bayesian network, among other possibilities. Machine-learning model 532 may be trained through a training process in which multiple training vibration signals are provided to feature extractor 546 to produce training features that are provided to machine-learning model 532. For each iteration during the training process, material types produced using a training vibration signal may be compared to a truth reference (from physical examination of the material types) to determine any difference (alternatively referred to as the "loss") between the training result and the truth reference. The loss may be used to modify machine-learning model 532 (e.g., by modifying the weights or parameters of machine-learning model 532) so as to reduce the loss during subsequent inferences using machine-learning model 532. It should be noted that while machine-learning model 532 is illustrated as a single machine-learning model, multiple machine-learning models may be employed to handle different types of features 547 or different types of model outputs.

Figure 6:
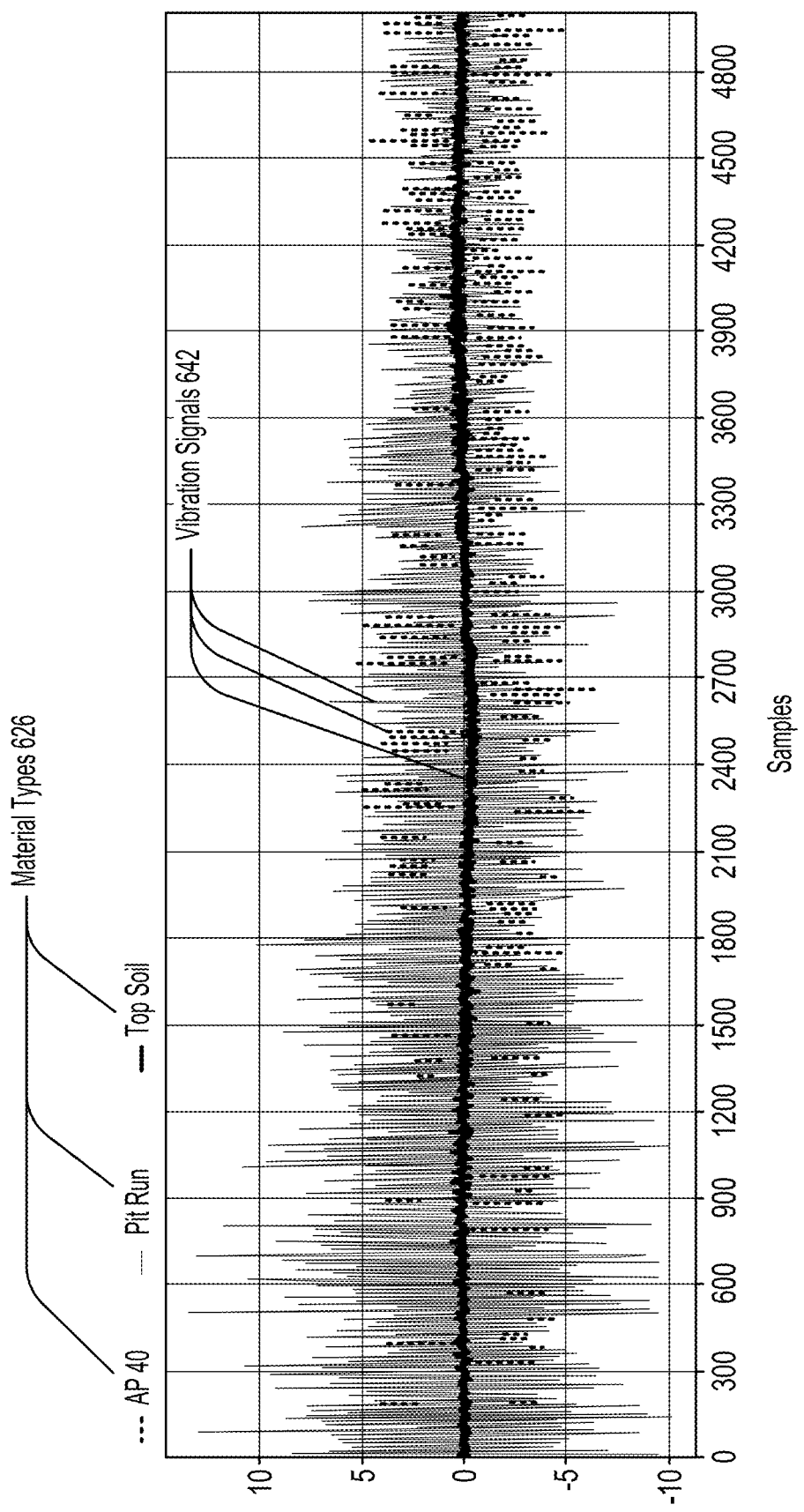
FIG. 6 illustrates example vibration signals for different material types.

FIG. 6 illustrates example vibration signals 642 for different material types 626, in accordance with some embodiments of the present disclosure. In the illustrated example, material types 626 include AP 40, pit run, and top soil. The amplitudes of vibration signals 642 are shown to vary between the different material types. For example, the vibration signal for pit run appears to have a large amplitude, the vibration signal for AP 40 appears to have a medium amplitude, and the vibration signal for top soil appears to have a small amplitude.

Figure 7:
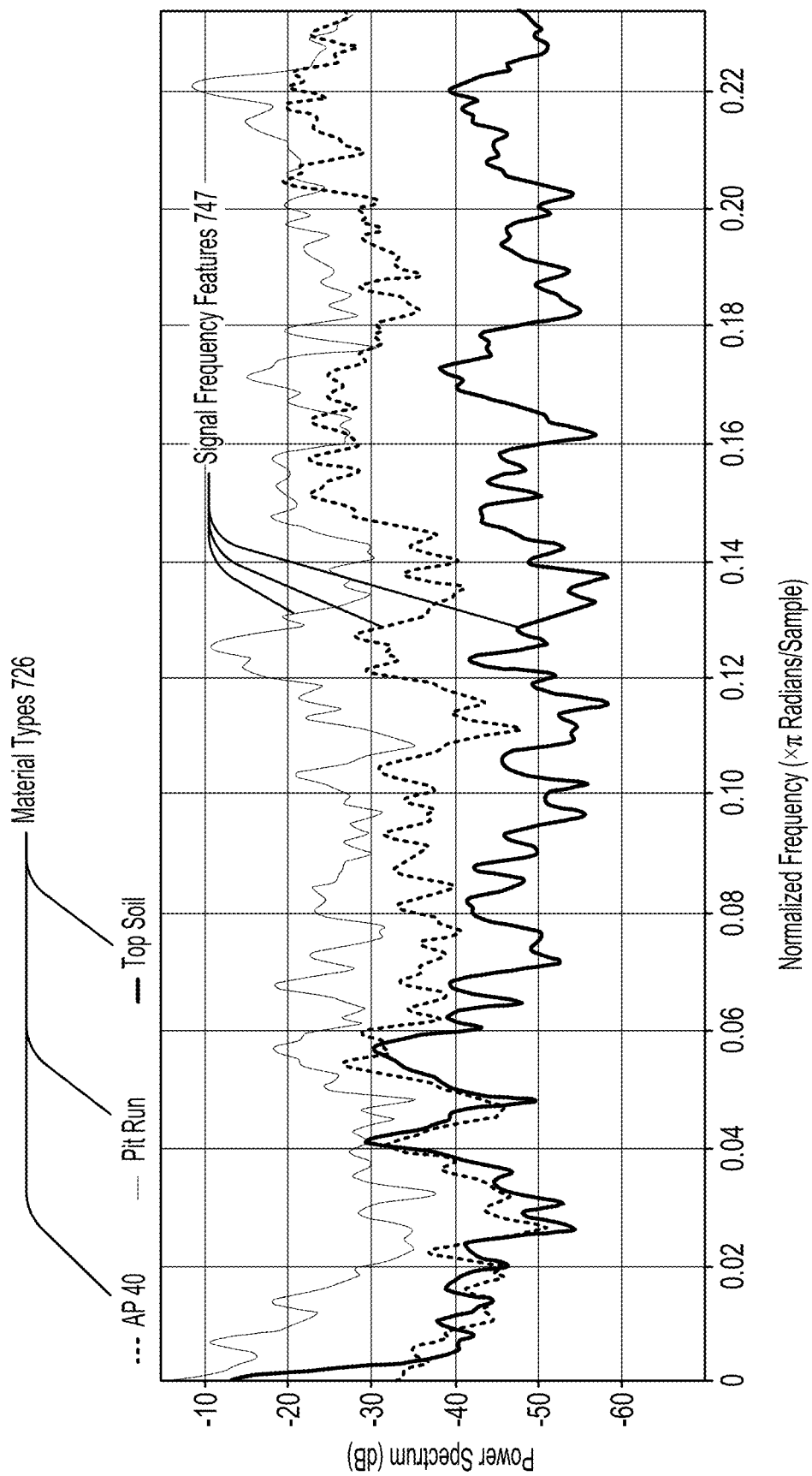
FIG. 7 illustrates example signal frequency features for different material types.

FIG. 7 illustrates example signal frequency features 747 for different material types 726, in accordance with some embodiments of the present disclosure. Signal frequency features 747 in FIG. 7 may correspond to vibration signal 642 in FIG. 6. Signal frequency features 747 include power spectrum values as a function of normalized frequency. The power spectrums are shown to vary between the different material types. For example, the power spectrum for pit run appears to be largest at all frequencies, the power spectrum for top soil appears to be smallest at all frequencies except the lowest frequencies, and the power spectrum for AP 40 appears to be between pit run and top soil at all frequencies except the lowest frequencies, where it is similar to top soil.

FIG. 8 illustrates a table that shows characteristics of signal amplitude features and signal frequency features for different material types, in accordance with some embodiments of the present disclosure. In some instances, top soil may correspond to signal amplitude features with low values, high-frequency features with low values, medium-frequency features with low values, and low-frequency features with low values. In some instances, AP 40 may correspond to signal amplitude features with high values, high-frequency features with high values, medium-frequency features with medium values, and low-frequency features with low values. In some instances, pit run may correspond to signal amplitude features with high values, high-frequency features with high values, medium-frequency features with high values, and low-frequency features with high values.

Figure 9:
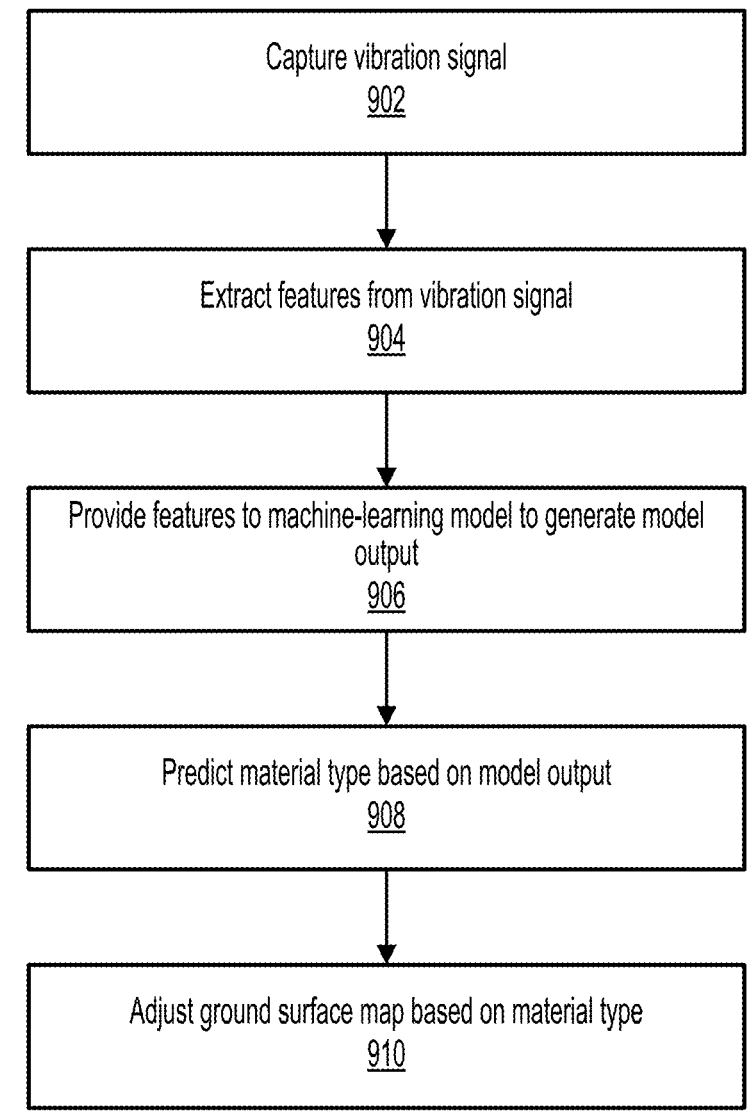
FIG. 9 illustrates an example method.

FIG. 9 illustrates an example method 900, in accordance with some embodiments of the present disclosure. One or more steps of method 900 may be omitted during performance of method 900, and steps of method 900 may be performed in any order and/or in parallel. One or more steps of method 900 may be performed by one or more processors, such as those included in a control unit (e.g., control units 360, 460). Method 900 may be implemented as a computer-readable medium or computer program product comprising instructions which, when the program is executed by one or more computers, cause the one or more computers to carry out the steps of method 900.

At step 902, a vibration signal is captured. The vibration signal may be captured using a vibration sensor. The vibration sensor may be mounted to an implement of a construction machine. The vibration signal may be indicative of a movement of the implement. In some embodiments, the vibration sensor may include an accelerometer and the vibration signal may include an acceleration signal. In some embodiments, the vibration sensor may include a gyroscope and the vibration signal may include a rotation signal. In some embodiments, the vibration sensor may include an IMU sensor (such as an accelerometer or a gyroscope) and the vibration signal may include an IMU signal (such as an acceleration signal or a rotation signal). In some embodiments, the vibration sensor may include an acoustic sensor (such as a microphone).

At step 904, one or more features are extracted from the vibration signal. The one or more features may include signal amplitude features, signal frequency features, implement motion features among other possibilities. The one or more features may be extracted by a feature extractor. The feature extractor may extract the one or more features from a set of implement positions in addition to the vibration signal.

At step 906, the one or more features are provided to a machine-learning model. Upon providing the one or more features to the machine-learning model, the machine-learning model may generate a model output based on the one or more features. The machine-learning model may be a pre-trained artificial recurrent neural network model, a support-vector machine, a neural network, among other possibilities.

At step 908, a material type (or one or more material types) may be predicted based on the model output. The one or more material types may correspond to the ground surface at a time frame during which the implement is interacting with a ground surface at a construction site. The implement may be interacting with the ground surface when the implement is cutting or digging into the ground surface. The material type may include one or more of: top soil, AP 40, or pit run, among other possibilities.

At step 910, a ground surface map is adjusted based on the material type. The ground surface map may be adjusted further based on a path of the implement during a predicted IOG period. Adjusting the ground surface map may include modifying/changing/updating the ground surface map to reflect the material type during the IOG period. In some embodiments, the ground surface map may be set equal to the path of the implement (e.g., the positions of the bucket edge) during the IOG period.

Figure 10:
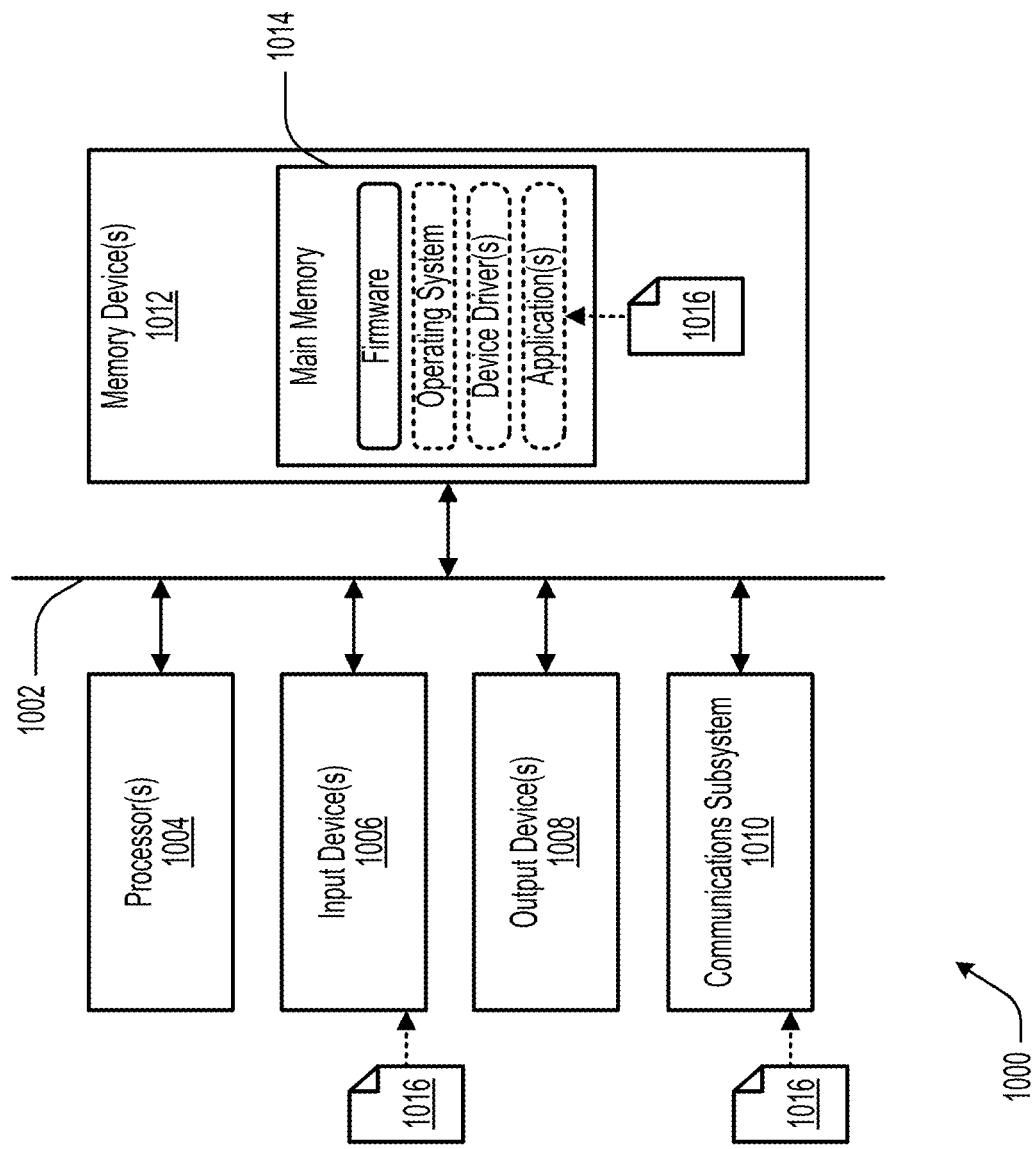
FIG. 10 illustrates an example computer system comprising various hardware elements.

FIG. 10 illustrates an example computer system 1000 comprising various hardware elements, in accordance with some embodiments of the present disclosure. Computer system 1000 may be incorporated into or integrated with devices described herein and/or may be configured to perform some or all of the steps of the methods provided by various embodiments. For example, in various embodiments, computer system 1000 may be incorporated into machine control system 400 and/or may be configured to perform method 1000. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

In the illustrated example, computer system 1000 includes a communication medium 1002, one or more processor(s) 1004, one or more input device(s) 1006, one or more output device(s) 1008, a communications subsystem 1010, and one or more memory device(s) 1012.

Computer system 1000 may be implemented using various hardware implementations and embedded system technologies. For example, one or more elements of computer system 1000 may be implemented as a field-programmable gate array (FPGA), such as those commercially available by XILINX®, INTEL®, or LATTICE SEMICONDUCTOR®, a system-on-a-chip (SoC), an application-specific integrated circuit (ASIC), an application-specific standard product (ASSP), a microcontroller, and/or a hybrid device, such as an SoC FPGA, among other possibilities.

The various hardware elements of computer system 1000 may be communicatively coupled via communication medium 1002. While communication medium 1002 is illustrated as a single connection for purposes of clarity, it should be understood that communication medium 1002 may include various numbers and types of communication media for transferring data between hardware elements. For example, communication medium 1002 may include one or more wires (e.g., conductive traces, paths, or leads on a printed circuit board (PCB) or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, communication medium 1002 may include one or more buses connecting pins of the hardware elements of computer system 1000. For example, communication medium 1002 may include a bus that connects processor(s) 1004 with main memory 1014, referred to as a system bus, and a bus that connects main memory 1014 with input device(s) 1006 or output device(s) 1008, referred to as an expansion bus. The system bus may itself consist of several buses, including an address bus, a data bus, and a control bus. The address bus may carry a memory address from processor(s) 1004 to the address bus circuitry associated with main memory 1014 in order for the data bus to access and carry the data contained at the memory address back to processor(s) 1004. The control bus may carry commands from processor(s) 1004 and return status signals from main memory 1014. Each bus may include multiple wires for carrying multiple bits of information and each bus may support serial or parallel transmission of data.

Processor(s) 1004 may include one or more central processing units (CPUs), graphics processing units (GPUs), neural network processors or accelerators, digital signal processors (DSPs), and/or other general-purpose or special-purpose processors capable of executing instructions. A CPU may take the form of a microprocessor, which may be fabricated on a single IC chip of metal-oxide-semiconductor field-effect transistor (MOSFET) construction. Processor(s) 1004 may include one or more multi-core processors, in which each core may read and execute program instructions concurrently with the other cores, increasing speed for programs that support multithreading.

Input device(s) 1006 may include one or more of various user input devices such as a mouse, a keyboard, a microphone, as well as various sensor input devices, such as an image capture device, a pressure sensor (e.g., barometer, tactile sensor), a temperature sensor (e.g., thermometer, thermocouple, thermistor), a movement sensor (e.g., accelerometer, gyroscope, tilt sensor), a light sensor (e.g., photodiode, photodetector, charge-coupled device), and/or the like. Input device(s) 1006 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

Output device(s) 1008 may include one or more of various devices that convert information into human-readable form, such as without limitation a display device, a speaker, a printer, a haptic or tactile device, and/or the like. Output device(s) 1008 may also include devices for writing to removable storage devices or other removable media, such as those described in reference to input device(s) 1006. Output device(s) 1008 may also include various actuators for causing physical movement of one or more components. Such actuators may be hydraulic, pneumatic, electric, and may be controlled using control signals generated by computer system 1000.

Communications subsystem 1010 may include hardware components for connecting computer system 1000 to systems or devices that are located external to computer system 1000, such as over a computer network. In various embodiments, communications subsystem 1010 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), among other possibilities.

Memory device(s) 1012 may include the various data storage devices of computer system 1000. For example, memory device(s) 1012 may include various types of computer memory with various response times and capacities, from faster response times and lower capacity memory, such as processor registers and caches (e.g., L0, L1, L2), to medium response time and medium capacity memory, such as random-access memory (RAM), to lower response times and lower capacity memory, such as solid-state drives and hard drive disks. While processor(s) 1004 and memory device(s) 1012 are illustrated as being separate elements, it should be understood that processor(s) 1004 may include varying levels of on-processor memory, such as processor registers and caches that may be utilized by a single processor or shared between multiple processors.

Memory device(s) 1012 may include main memory 1014, which may be directly accessible by processor(s) 1004 via the memory bus of communication medium 1002. For example, processor(s) 1004 may continuously read and execute instructions stored in main memory 1014. As such, various software elements may be loaded into main memory 1014 to be read and executed by processor(s) 1004 as illustrated in FIG. 10. Typically, main memory 1014 is volatile memory, which loses all data when power is turned off and accordingly needs power to preserve stored data. Main memory 1014 may further include a small portion of non-volatile memory containing software (e.g., firmware, such as BIOS) that is used for reading other software stored in memory device(s) 1012 into main memory 1014. In some embodiments, the volatile memory of main memory 1014 is implemented as RAM, such as dynamic random-access memory (DRAM), and the non-volatile memory of main memory 1014 is implemented as read-only memory (ROM), such as flash memory, erasable programmable read-only memory (EPROM), or electrically erasable programmable read-only memory (EEPROM).

Computer system 1000 may include software elements, shown as being currently located within main memory 1014, which may include an operating system, device driver(s), firmware, compilers, and/or other code, such as one or more application programs, which may include computer programs provided by various embodiments of the present disclosure. Merely by way of example, one or more steps described with respect to any methods discussed above, may be implemented as instructions 1016, which are executable by computer system 1000. In one example, such instructions 1016 may be received by computer system 1000 using communications subsystem 1010 (e.g., via a wireless or wired signal that carries instructions 1016), carried by communication medium 1002 to memory device(s) 1012, stored within memory device(s) 1012, read into main memory 1014, and executed by processor(s) 1004 to perform one or more steps of the described methods. In another example, instructions 1016 may be received by computer system 1000 using input device(s) 1006 (e.g., via a reader for removable media), carried by communication medium 1002 to memory device(s) 1012, stored within memory device(s) 1012, read into main memory 1014, and executed by processor(s) 1004 to perform one or more steps of the described methods.

In some embodiments of the present disclosure, instructions 1016 are stored on a computer-readable storage medium (or simply computer-readable medium). Such a computer-readable medium may be non-transitory and may therefore be referred to as a non-transitory computer-readable medium. In some cases, the non-transitory computer-readable medium may be incorporated within computer system 1000. For example, the non-transitory computer-readable medium may be one of memory device(s) 1012 (as shown in FIG. 10). In some cases, the non-transitory computer-readable medium may be separate from computer system 1000. In one example, the non-transitory computer-readable medium may be a removable medium provided to input device(s) 1006 (as shown in FIG. 10), such as those described in reference to input device(s) 1006, with instructions 1016 being read into computer system 1000 by input device(s) 1006. In another example, the non-transitory computer-readable medium may be a component of a remote electronic device, such as a mobile phone, that may wirelessly transmit a data signal that carries instructions 1016 to computer system 1000 and that is received by communications subsystem 1010 (as shown in FIG. 10).

Instructions 1016 may take any suitable form to be read and/or executed by computer system 1000. For example, instructions 1016 may be source code (written in a human-readable programming language such as Java, C, C++, C#, Python), object code, assembly language, machine code, microcode, executable code, and/or the like. In one example, instructions 1016 are provided to computer system 1000 in the form of source code, and a compiler is used to translate instructions 1016 from source code to machine code, which may then be read into main memory 1014 for execution by processor(s) 1004. As another example, instructions 1016 are provided to computer system 1000 in the form of an executable file with machine code that may immediately be read into main memory 1014 for execution by processor(s) 1004. In various examples, instructions 1016 may be provided to computer system 1000 in encrypted or unencrypted form, compressed or uncompressed form, as an installation package or an initialization for a broader software deployment, among other possibilities.

In one aspect of the present disclosure, a system (e.g., computer system 1000) is provided to perform methods in accordance with various embodiments of the present disclosure. For example, some embodiments may include a system comprising one or more processors (e.g., processor(s) 1004) that are communicatively coupled to a non-transitory computer-readable medium (e.g., memory device(s) 1012 or main memory 1014). The non-transitory computer-readable medium may have instructions (e.g., instructions 1016) stored therein that, when executed by the one or more processors, cause the one or more processors to perform the methods described in the various embodiments.

In another aspect of the present disclosure, a computer-program product that includes instructions (e.g., instructions 1016) is provided to perform methods in accordance with various embodiments of the present disclosure. The computer-program product may be tangibly embodied in a non-transitory computer-readable medium (e.g., memory device(s) 1012 or main memory 1014). The instructions may be configured to cause one or more processors (e.g., processor(s) 1004) to perform the methods described in the various embodiments.

In another aspect of the present disclosure, a non-transitory computer-readable medium (e.g., memory device(s) 1012 or main memory 1014) is provided. The non-transitory computer-readable medium may have instructions (e.g., instructions 1016) stored therein that, when executed by one or more processors (e.g., processor(s) 1004), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes reference to one or more of such users, and reference to "a processor" includes reference to one or more processors and equivalents thereof known to those skilled in the art, and so forth.

Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A computer-implemented method of determining a material type while an implement of a construction machine is interacting with a ground surface, the computer-implemented method comprising:
    causing a movement of the implement using one or more control signals;
    capturing a vibration signal that is indicative of the movement of the implement;
    extracting one or more features from the vibration signal;
    estimating one or more positions of the implement during the movement of the implement;
    providing the one or more features and the one or more positions of the implement to a machine-learning model to generate a model output; and
    predicting the material type of the ground surface based on the model output.

2. The computer-implemented method of claim 1, wherein the vibration signal is captured using a vibration sensor mounted to the construction machine.

3. The computer-implemented method of claim 2, wherein the vibration sensor includes one or both of an accelerometer or a gyroscope, and wherein the vibration signal includes one or both of an acceleration signal or a rotation signal.

4. The computer-implemented method of claim 2, wherein the vibration sensor is mounted to the implement.

5. The computer-implemented method of claim 1, wherein the one or more features include one or both of signal amplitude features or signal frequency features.

6. The computer-implemented method of claim 1, wherein the machine-learning model is a pre-trained artificial recurrent neural network, a feed-forward neural network, or a support-vector machine.

7. The computer-implemented method of claim 1, further comprising:
    predicting a first material type of a first portion of the ground surface based on the model output; and
    predicting a second material type of a second portion of the ground surface based on the model output.

8. The computer-implemented method of claim 1, further comprising:
    predicting a location of a boundary between a first material type of a first portion of the ground surface and a second material type of a second portion of the ground surface based on the model output.

9. A system for determining a material type while an implement of a construction machine is interacting with a ground surface, the system comprising:
    one or more processors; and
    a computer-readable medium comprising instructions that, when executed by the one or more processors, cause the one or more processors to perform operations comprising:
        causing a movement of the implement using one or more control signals;
        capturing a vibration signal that is indicative of the movement of the implement;
        extracting one or more features from the vibration signal;
        estimating one or more positions of the implement during the movement of the implement;
        providing the one or more features and the one or more positions of the implement to a machine-learning model to generate a model output; and
        predicting the material type of the ground surface based on the model output.

10. The system of claim 9, wherein the vibration signal is captured using a vibration sensor mounted to the construction machine.

11. The system of claim 10, wherein the vibration sensor includes one or both of an accelerometer or a gyroscope, and wherein the vibration signal includes one or both of an acceleration signal or a rotation signal.

12. The system of claim 10, wherein the vibration sensor is mounted to the implement.

13. The system of claim 9, wherein the one or more features include one or both of signal amplitude features or signal frequency features.

14. The system of claim 9, wherein the machine-learning model is a pre-trained artificial recurrent neural network, a feed-forward neural network, or a support-vector machine.

15. The system of claim 9, wherein the operations further comprise:
    predicting a first material type of a first portion of the ground surface based on the model output; and
    predicting a second material type of a second portion of the ground surface based on the model output.

16. The system of claim 9, wherein the operations further comprise:
    predicting a location of a boundary between a first material type of a first portion of the ground surface and a second material type of a second portion of the ground surface based on the model output.

17. A non-transitory computer-readable medium comprising instructions that, when executed by one or more processors, cause the one or more processors to perform operations for determining a material type while an implement of a construction machine is interacting with a ground surface, the operations comprising:
    causing a movement of the implement using one or more control signals;
    capturing a vibration signal that is indicative of the movement of the implement;
    extracting one or more features from the vibration signal;
    estimating one or more positions of the implement during the movement of the implement;
    providing the one or more features and the one or more positions of the implement to a machine-learning model to generate a model output; and
    predicting the material type of the ground surface based on the model output.

18. The non-transitory computer-readable medium of claim 17, wherein the vibration signal is captured using a vibration sensor mounted to the construction machine.

19. The non-transitory computer-readable medium of claim 18, wherein the vibration sensor includes one or both of an accelerometer or a gyroscope, and wherein the vibration signal includes one or both of an acceleration signal or a rotation signal.

20. The non-transitory computer-readable medium of claim 18, wherein the vibration sensor is mounted to the implement.

* * * * *